Patented Nov. 6, 1951

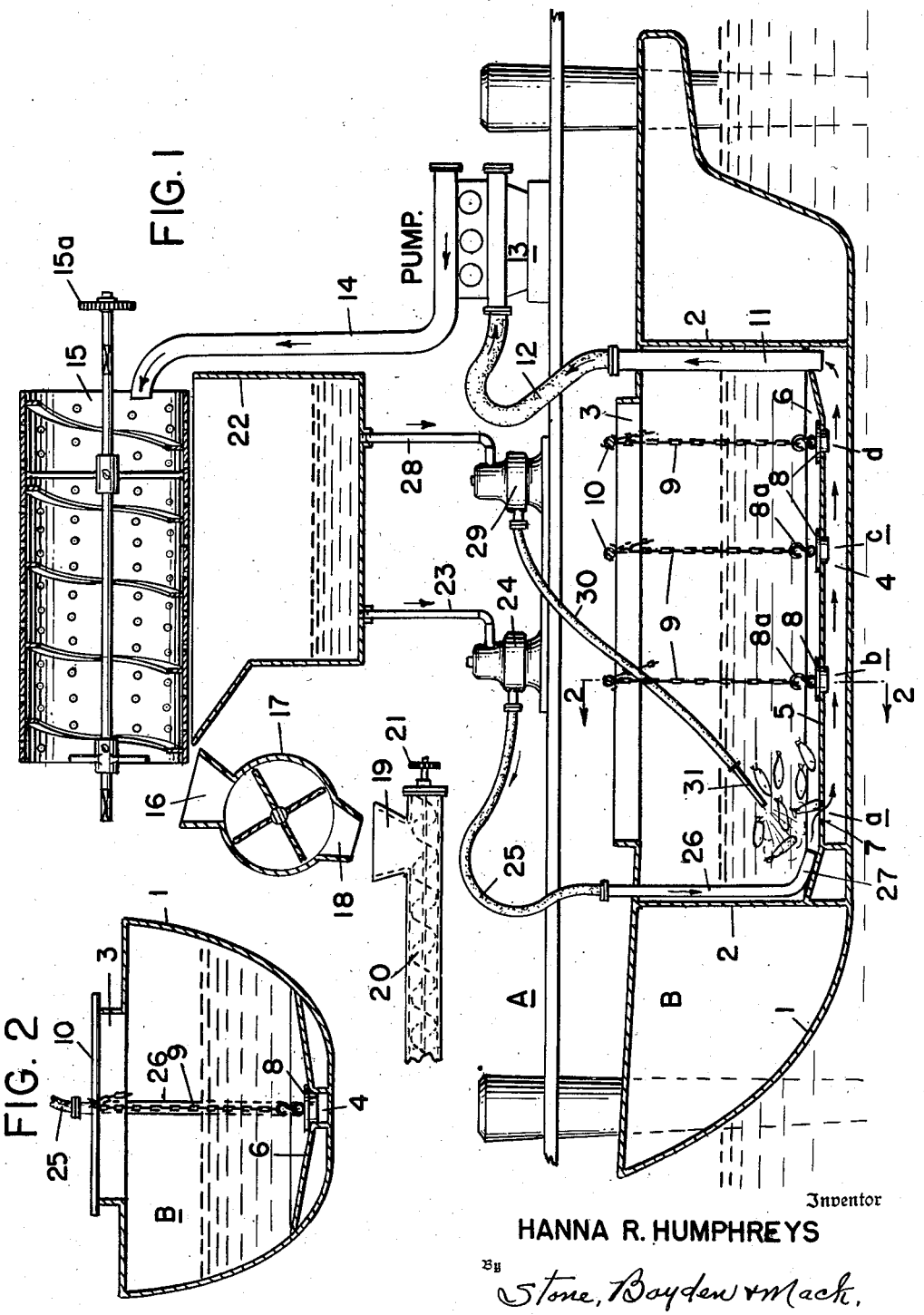

2,573,907

UNITED STATES PATENT OFFICE 2,573,907

APPARATUS FOR HANDLING FISH

Hanna R. Humphreys, Weems, Va., assignor to The Humphreys Railways, Inc., Weems, Va., a corporation of Virginia Application October 7, 1946, Serial No. 701,657

3 Claims. (Cl. 214—14)

This invention relates to means for and a method of unloading and handling fish in bulk, as from the hold of a fishing boat.

The present application is a continuation-in-part of my prior co-pending application Serial No. 604,445, filed July 11, 1945 and now abandoned.

The unloading of boat loads of fish and the delivery of these fish to a packing house or other factory, has always presented a difficult problem. This unloading and handling of the fish has heretofore been done entirely by hand and is a very tedious and laborious operation.

One of the objects of the present invention is to devise a method and apparatus for unloading and conveying boat loads of fish by means of a pump.

Another object is to devise an arrangement in which, after sufficient water has been added to the fish in the hold to produce a fluid mass, this fluid mass is pumped out of the hold and the fish then separated from the water, and the water collected and returned to the boat.

A still further object is to devise means for returning this water to the hold of the boat in such a manner that it assists in moving the mixture of fish and water toward and into the pump.

Yet another object is to devise an improved construction of boat so designed as to facilitate the channeling of the mass of fish toward the pump intake.

In order that the invention may be readily understood, reference is had to the accompanying drawings forming part of this specification, and in which:

Fig. 1 is a view partly in section and partly in side elevation showing my improved construction of boat and accessories, and illustrating the cooperating apparatus mounted on a fixed support, such as a wharf; and Fig. 2 is a transverse section substantially on the line 2—2 of Fig. 1 looking in the direction of the arrows.

Referring to the drawing in detail, A designates a pier or wharf, while B indicates the boat in its entirety.

This boat comprises the usual hull 1 having transverse partitions or bulk heads 2, forming between them a compartment adapted to receive fish in bulk, mixed with sufficient water to render the mass fluid.

At the top of the fish compartment is an open hatch 3.

Extending longitudinally of the boat, preferably at the center, is a trough or duct 4, having a top wall 5. From the upper edge of this trough extends on each side a sloping dunnage 6, this dunnage and the top wall 5 of the duct, forming the bottom of the fish compartment or hold.

Formed in the top wall 5 of the duct 4 are a series of longitudinally spaced holes or openings 7, four such openings being shown and being designated a, b, c and d. Individually removable flanged covers 8 normally close all but one of these openings, these covers being shown as suspended by means of hooks 8ª from chains 9, secured to transverse bars 10, supported on the edges of the hatch 3. It will be understood that the openings 7 and covers 8 are all of the same size, so that the covers are interchangeable, and any cover may be used to close any desired opening.

Communicating with one end of the duct 4 is a vertically disposed suction pipe 11. This is adapted to be connected by means of a suitable detachable coupling with one end of a large flexible hose 12, the other end of which is connected to the intake of a pump 13, suitably driven by an engine or the like (not shown), and mounted upon the wharf A. This pump may be of any desired type, but preferably is of the kind illustrated and described in my above mentioned prior co-pending application.

From the pump 13 extends a delivery pipe or conduit 14 to an elevated point where it discharges into a rotary screen in the nature of a perforated drum 15, having a spiral flange therein to act as a conveyer. This drum or screen is driven in any suitable way, as by means of a sprocket 15ª.

At the end opposite the delivery pipe 14, the rotary drum or screen is arranged to discharge into the hopper 16 of a meter or measuring device 17. This, in turn, discharges through a chute 18 into the receiving hopper 19 of a suitable conveyer 20, driven as by means of a sprocket 21.

Disposed beneath the rotary drum or screen 15 is a tank 22, arranged to receive the water discharged from said drum. From this tank extends a pipe 23 to a pump 24, which may be of the centrifugal type, also mounted on the wharf, and from the discharge side of this pump extends a flexible hose 25. The free end of this hose is adapted to be connected by a suitable coupling to the upper end of a vertically extending jet pipe 26, disposed at the end of the fish compartment of the boat opposite to that at which the suction pipe 11 is mounted. The lower end of the jet pipe 26 is bent almost at right angles to form a discharge nozzle 27, which is directed longitudinally of the boat toward the other end of the compartment where the suction pipe 11 is located. The jet nozzle 27 is disposed close to the top wall of the duct 4 adjacent the opening a therein, so that the jet delivered therefrom tends to sweep over and into this opening.

A second pipe 28 extends from the tank 22 to a second pump 29, also mounted on the wharf, and from this second pump extends a flexible hose 30, having at its free end a nozzle 31. This is preferably different from the conventional hose nozzle, and desirably consists of a straight section of pipe of substantial length, such, for example, as two feet. It will be noted that the hose 30 is not attached to any part of the boat, but may be freely manipulated by hand, as desired.

The operation of the apparatus is as follows. The boat, having been loaded with fish, mixed with sufficient water to render the mass fluid, is brought up alongside the wharf, as shown in Fig. 1. Thereupon, the hoses 12 and 25 are connected to the respective pipes 11 and 26, and then the pump 13 started. The covers 8 are normally in position over the openings b, c and d, as shown in the drawings, the opening a being free and uncovered. A little water having been left in the tank 22, the pumps 24 and 29 cause high pressure jets to be discharged from the nozzles 27 and 31. The nozzle 31 is plunged, by the operator, into the mass of fish adjacent the opening a, and the jet issuing therefrom tends to loosen up the mass and drive the fish down through the opening a into the duct 4. At the same time, the jet issuing from the nozzle 27 sweeps over the bottom of the compartment and into the opening a, thus entraining and carrying along the fish with it. Thus, by the use of these hydraulic means, the mass of fish is impelled through the opening a into and along the duct 4. At the same time, suction being created in the pipe 11 by the pump 13, the mixed mass of fish and water is drawn up through the suction pipe 11, and delivered from the discharge pipe 14 into the rotary drum or screen 15. Here the water is separated from the fish, such water being collected in the tank 22, while the fish, impelled by the spiral flange inside of the drum, are carried along and discharged from the left hand end into the metering device 17 and thence are delivered into the conveyer 20, by which they are carried to the desired point.

After the mass of fish immediately adjacent the opening a has been thus unloaded, the cover is removed from the opening b and placed upon the opening a. The nozzle 31 is then inserted in the mass of fish surrounding the opening b, thus loosening them up and impelling them into and through such opening. At the same time, the current of water created by the jet nozzle 27 sweeps oper the closed opening a and surrounding area and flows toward and into the opening b, thus aiding in moving the fish into and through this opening.

Similarly, the covers are removed successively from the openings c and d, as unloading progresses, and finally, after all of the fish have been unloaded, the cover is removed again from the opening a and placed upon the opening d. This puts the boat in condition to receive a new load.

It will be noted that very little additional water is used in carrying out my improved method of unloading and handling the fish, since the water, after having been separated by the rotary screen, is constantly returned to the hold of the boat and again recirculated. Thus, the same water is used over and over again in a cycle, instead of being thrown overboard and fresh water admitted. In this way, pollution of the water surrounding the wharf is avoided, and, moreover, the re-circulated water finally accumulates a considerable amount of fish oil. This may be recovered by suitable processing as a by-product. Such processing also serves to destroy harmful bacteria and render the resulting waste water unobjectionable.

By virtue of my improved arrangement, relatively little water is required. For example, I have found, in practice, that approximately 2,500 gallons is sufficient to effect the unloading of 500 tons of fish. Also, the manual labor in carrying out the unloading operation in accordance with the invention is reduced to a minimum, not more than one-fifth of the number of men formerly required being necessary.

What I claim is:

1. In a system for handling fish, the combination with a boat having a compartment adapted to contain a mass of fish, of a duct extending along the bottom of said compartment, having an inlet opening in its top wall adjacent one end, the upper surface of said top wall being substantially smooth, a suction pipe communicating with the other end of said duct, a pump connected with said suction pipe, and means for directing a high pressure jet of water over the smooth surface of said duct longitudinally thereof beneath the mass of fish towards and into said opening, whereby the fish adjacent said opening are caused to enter the same and to pass through said duct toward said suction pipe.

2. In a system for handling fish, the combination with a boat having an elongated compartment adapted to contain a mass of fish mixed with water, of a duct extending longitudinally of said compartment below the same and having a top wall forming part of the bottom of said compartment, said bottom being substantially smooth, said top wall having an inlet opening adjacent one end, a suction pipe tapping the other end of said duct, a pump connected with said suction pipe, and means in addition to said pump for causing a current of water to flow along the smooth bottom of said compartment beneath the mass of fish towards said opening, whereby the fish are moved to and caused to pass through said opening into said duct.

3. In a system for handling fish, the combination with a boat having an elongated compartment adapted to contain a mass of fish mixed with water, of a duct extending longitudinally of said compartment below the same and having a top wall forming part of the bottom of said compartment, said top wall having a substantially smooth upper surface and provided with a series of inlet openings disposed at spaced points along the length thereof, movable means normally closing certain of said openings, a suction pipe at one end of said duct and a fixed jet pipe at the other, said jet pipe being constructed to direct a jet of water along the smooth upper surface of said duct toward and into any of said openings which are not closed by said movable means, and a pump connected with said suction pipe.

HANNA R. HUMPHREYS.

REFERENCES CITED

The following references are of record in the file of this patent:

UNITED STATES PATENTS

| Number | Name | Date |
|---|---|---|
| 418,421 | Osborn | Dec. 31, 1889 |
| 512,865 | Collins | Jan. 16, 1894 |
| 689,741 | McDougall | Dec. 24, 1901 |
| 1,264,688 | Schilling | Apr. 30, 1918 |
| 2,346,505 | Preuss | Apr. 11, 1944 |
| 2,396,305 | Toft | Mar. 12, 1946 |